United States Patent Office 3,812,053
Patented May 21, 1974

3,812,053
DAYLIGHT FLUORESCENT PIGMENTS AND
PROCESS FOR PREPARING THEM
Siegfried Noetzel, Mainz, Germany, assignor to Farbwerke Hoechst Aktiengesellschaft vormals Meister Lucius & Bruning, Frankfurt am Main, Germany
No Drawing. Filed Jan. 20, 1972, Ser. No. 219,517
Claims priority, application Germany, Jan. 22, 1971,
P 21 02 942.5
Int. Cl. C09k 1/02
U.S. Cl. 252—301.2 R 4 Claims

ABSTRACT OF THE DISCLOSURE

New daylight fluorescent pigments which contain an organic fluorescent dyestuff and a cross-linked, hydroxyl group containing polyester or a cross-linked copolymer of olefinically unsaturated compounds containing hydroxyl groups and of olefinically unsaturated compounds free from hydroxyl groups, and a process for their preparation which comprises incorporating the organic fluorescent dyestuff into the resin. These daylight fluorescent pigments may be employed for preparing fluorescent paints, for example air-drying lacquers on the basis of alkyd resin or physically drying lacquers on the basis of acrylic resins, as well as for preparing fluorescent printing inks such as inks for screen printing, intaglio printing, book printing and offset-litho printing. Due to their high resistance to heat, they are particularly suitable for fluorescent dyeing of plastics and enamels.

---

The present invention relates to new daylight fluorescent pigments on the basis of cross-linked polyesters or copolymers containing hydroxl groups from olefinically unsaturated compounds containing hydroxyl groups and olefinically unsaturated compounds being free from hydroxyl groups. The invention also relates to a process for preparing these pigments.

As starting components for the polyesters containing hydroxyl groups, there are considered the following bi- and polyfunctional organic carboxylic acids and alcohols: saturated aliphatic, aromatic and cycloaliphatic carboxylic acids, such as adipic acid, phthalic acid, isophthalic acid, terephthalic acid, trimellitic acid and cyclohexane-dicarboxylic acid-(1,4) as well as saturated aliphatic, aromatic, cycloaliphatic and nitrogen-containing alcohols such as ethylene glycol, 1,2-propylene-glycol, 1,3-butylgene-glycol, neopentyl glycol (2,2 - dimethyl-propane-diol-1,3), butane-diol-1,4, hexane-diol-1,6, glycerol, trimethylol propane, trimethylol ethane, hexane-triol-1,2,6, pentaerythrite, the hexites, 1,4-dihydroxy-methyl-benzene, 1,4-dihydroxymethyl-cyclohexane and diethanol amine. There may also be used unsaturated oligofunctional carboxylic acids and alcohols such as fumaric acid, maleic acid and butene-2-diol-1,4 in mixture with saturated oligofunctional carboxylic acids or alcohols.

The polyesters containing hydroxyl groups are prepared according to known processes by melt condensation in the presence of esterification or transesterification and polycondensation catalysts such as zinc acetate or manganese acetate and antimonium trioxide at temperature of up to 250° C., if desired in vacuo, while distilling off water or the lower alcohols. The conditions for condensation, the type and the quantities of the acid and alcohol component used determine the properties of the final product; they have to be chosen in such a way that the condensation products are formed with a relatively low molecular weight.

There are considered especially very branched polyesters with hydroxyl numbers of from 200 to 600 and molecular weights of from 300 to 3000. They are obtained for example by condensation of a dicarboxylic acid ester such as terephthalic acid dimethyl ester with a triol such as trimethylol propane in the molar ratio of 1:2 to 1:0.5.

As examples for the olefinically unsaturated compounds free from hydroxyl groups, which may be copolymerized with the olefinically unsaturated compounds containing hydroxyl groups such as (meth)-acrylic acid-β-hydroxyethyl ester or (meth)-acrylic acid-β-hydroxy-propyl ester, there may be mentioned the following compounds: (meth)-acrylic acid-methyl, -ethyl, -propyl, -n-butyl, -t-butyl-ester, styrene, α-methylstyrene, acrylo-nitrile, vinyl chloride, vinyl acetate, vinyl propionate and vinyl butyrate.

The copolymers containing hydroxyl groups of the α,β-unsaturated CC— compounds are prepared by solvent polymerization in solvents such as aromatic hydrocarbons, ketones, esters or ethers, which do not contain active hydrogen, with catalysts, as for example dibenzoyl peroxide, di-tert-butylperoxide or azoisobutyronitrile, if desired in the presence of regulators of the molecular weight such as aliphatic mercaptans. It has turned out to be suitable to realize the polymerization process in the following way: the monomeric mixture which contains the peroxide catalyst and, if desired, the compound regulating the molecular weight, is added as a dosage during all the polymerization time. By this way, copolymers having molecular weights of from about 10,000 to 80,000 are obtained, which are particularly advantageous as starting components for preparing the polyurethane resins. The quantity of the hydroxyl compound incorporated into the copolymer depends on the quantity and the functionality of the cross-linking substance; it should preferably amount to 10–50% by weight of the total weight of the copolymer.

In the preparation of the polyesters containing hydroxyl groups as well as of the copolymers containing hydroxyl groups the type and the quantity of the starting components used may vary within wide limits. However, it is not difficult for the expert to choose such starting components in such mixture ratios as to permit that the support resins obtained have the properties necessary for the daylight pigments.

As cross-linking substances for the polyesters and copolymers containing hydroxyl groups, there may be used aliphatic and cycloaliphatic di- and polyisocyanates, which are characterized by a good fastness to light.

As examples for the isocyanates there may be mentioned the hexamethylene-1,6-diisocyanate (Desmodur H®), tetramethylene - 1,4 - diisocyanate, 2,2,4-trimethyl-hexamethylene-diisocyanate, methyl - cyclohexylene-diisocyanate (hydrogenated toluene-diisocyanate), 2,6-diisocyanate-methylcaproate, isophorone-diisocyanate, dicyclohexyl-methane-diisocyanate, polyisocyanates containing low-molecular biuret groups (Desmodur H®), which are formed by reaction with hexamethylene-1,6-diisocyanate and water (Ang. Chem, 74, 799–801 (1962)) and the reaction products containing isocyanate groups of the above-mentioned di- and polyisocyanates with oligofunctional alcohols such as ethylene glycol, neopentyl glycol, trimethylol ethane, trimethylol propane, pentaerythrite and polyfunctional hydroxy compounds such as the hydroxyl polyesters and the hydroxyl copolymers of α,β-unsaturated compounds. If an excellent fastness to light of the cross-linked products is not necessary, there may also be used for cross-linking aromatic di- and polyisocyanates, as for example the 80/20% or 65/35% mixture from 2,4- and 2,6-toluene-diisocyanate (Desmodur T 80 and T 65®) or their isocyanate groups containing reaction products with triols, such as trimethylol propane (Desmodur L®).

For preparing the support resins, the polyesters and copolymers containing hydroxyl groups are mixed in solvents containing no active hydrogen such as monoalkyl glycol esters, dimethyl formamide, dimethyl sulfoxide, dioxane with the isocyanates at room temperature or elevated temperature and cross-linked at 120°–200° C. at normal pressure or in vacuo for some hours, under elimination of the solvent. It is expedient to add to an alkylglycol-acetate solution, which contains 40–60% by weight of the polyhydroxyl compound, the cross-linking substance while stirring well at temperatures of from 50° to 120° C. The quantity of the cross-linking substance added depends on the functionality of the cross-linking substance and on the desired degree of hardness and brittleness of the support resin formed. In general, the polyhydroxyl compound and the cross-linking substance are used in an equivalent ratio, i.e. one hydroxy group corresponds to one isocyanate group. Of course, the cross-linking substance concerned may be used in amounts of up to a half equivalent more or less than the hydroxyl compound, whereby cross-linking products having a small or high degree of hardness are obtained. If desired, the polyhydroxyl-isocyanate cross-linking may also be effected by adding catalytical compounds such as triethyl amine, 1,4-diazobicyclo-(2,2,2)-octane (Dabko®), di-n-butyl-tin-diacetate or -dilaurate.

The support resins thus obtained are characterized by a good transparency and clearness and a sufficient resistance to organic solvents, oxygen and humidity. Furthermore they have a better resistance to heat and a better fastness to light than the resins which are known from U.S. Patent Specifications Nos. 2,498,592, 2,809,954, 2,938,873, 3,116,256 and 3,412,036, the British Patent Specifications Nos. 734,181, 748,484, 792,616 and 1,048,983 and the German Patent Specification No. 961,575. These properties make the resins according to the invention particularly suitable for being used in daylight fluorescent pigments. These pigments consist of a colorless, finely ground support resin, into which a fluorescent dyestuff has been incorporated. Such daylight fluorescent pigments are used more and more in the lacquer, printing ink and plastics industry as well as in the field of textiles and for coating paper.

As fluorescent dyestuffs there are considered organic compounds which are fluorescent at daylight in dissolved or solid, crystalline form, as for example fluorescent dyestuffs of the rhodamine, sulforhodamine or naphthalimide series. There may also be employed the dyestuffs described in French Patent Specifications Nos. 1,590,506, 1,444,489, 1,488,113 and 1,470,793.

For preparing the fluorescent daylight pigments according to the invention, the fluorescent dyestuffs are incorporated into the support resin by dissolving or dispersing them in the solution which contains the mixture of the polyhydroxyl compound and the cross-linking substance, whereupon the mixture is cured in the manner described above. However, the fluorescent dyestuffs may already be dissolved or dispersed in the solution which contains the polyhydroxyl compound, or they are employed in a form chemically bound to the cross-linking substances.

The cured product thus obtained is then converted into a finely divided form by dry or wet grinding in a ball or perl mill. Grinding is expediently carried out in the presence of water. The particle size of the daylight fluorescent pigment, which may vary within wide limits, depends to a large extent on the desired field of application. Thus, the average particle size of the daylight fluorescent pigment generally ranges between about 5 and 30μ, if it is to be used for silk screen printing or for preparing lacquers, and between about 0.1 and 5μ, if printing inks are to be prepared.

The concentration of the dyestuff in the resin depends above all on the type of the resin, on the dyestuff used and on the desired application of the daylight fluorescent pigment. The dyestuff concentration generally ranges between about 0.1 and 10 percent by weight. The daylight fluorescent pigment preferably contains the dyestuff in a concentration which provides the best possible brilliancy, the tinctorial strength of the product dyed with this dyestuff being good.

The daylight fluorescent pigments prepared by using the condensation resins according to the invention may be employed for preparing fluorescent paints, for example, air-drying lacquers on the basis of alkyd resins or physically drying lacquers on the basis of acrylic resins, as well as for preparing fluorescent printing inks such as inks for screen printing, intaglio printing, book printing and offset-litho printing. Due to their high resistance to heat, they are especially suitable for fluorescent dyeing of plastics material, which are usually processed between 200° and 300° C., and of enamels which are stoved above 150° C.

The following Examples illustrate the invention. Parts and percentages are by weight unless stated otherwise.

EXAMPLE 1

200 g. of Ethyl glycol acetate were heated to 140° C. While maintaining this temperature, a mixture of 120 g. of methyl methacrylate, 80 g. of hydroxy-ethyl-methacrylate, 2.4 g. of di-tert.-butyl-peroxide and 4.8 g. of tert.-dodecylmercaptan were added in the course of five hours, and then copolymerization was continued for one hour. The reaction mixture had then reached a solids content of 48.1%. 30 parts each of the acrylate resin solution thus obtained were mixed at 100° C. with 7.5, 15 or 22.5 parts of a polyisocyanate containing buiret groups, which was prepared by reacting hexamethylene-1,6-diisocyanate (Desmodur N®) with water and then cured at 150° C. under greatly reduced pressure in 15 hours. The transparent brittle cured products obtained were ground to a fine powder. They decomposed at 260–290° C. and were unsoluble in xylene, ethanol, butanol, butyl acetate and acetone.

30 parts of the above acrylate resin solution, 15 parts of a polyisocyanate containing biuret groups (Desmodur N®) and 0.15 part of 10-methoxybenzoxanthene-3,4-dicarboxylicacid hydrazide were mixed at about 100° C. by stirring well and cured at 150° C. under greatly reduced pressure in 15 hours. A product of an intense green-yellow fluorescence was obtained, which could be ground well to a fine powder in a ball or vibratory mill. The daylight fluorescent pigment thus obtained decomposed at 260–290° C. and was unsoluble in xylene, ethanol, butanol, butyl acetate and acetone.

30 parts of the above acrylate resin solution, 15 parts of a polyisocyanate containing biuret groups (Desmodur N®) and 0.15 part of 10-methoxybenzoxanthene-3,4-dicarboxylic acid hydrazide were mixed at about 100° C. while stirring well and cured at 150° C. under greatly reduced pressure in 15 hours. A product of an intense green-yellow fluorescence was obtained, which could be easily ground to a fine powder in a ball or vibratory mill. The daylight fluorescent pigment thus obtained decomposed at 260–290° C. and was unsoluble in xylene, ethanol, butanol, butylacetate and acetone.

Instead of Desmodur N® there may also be used reaction products of hexamethylene-1,6-diisocyanate (Desmodur H®) with polyvalent alcohols, for example trimethylol propane. Such reaction product was obtained if 151.2 g. of Desmodur H® were added at 120° C. to a cyclohexanone solution which contained 40.2% of trimethylol propane and if the mixture was heated for one hour to 140° C. under exclusion of moisture.

EXAMPLE 2

200 g. of ethylene glycol acetate were heated to 140° C. At this temperature a mixture of 120 g. of n-butyl-methacrylate, 80 g. of β-hydroxy-propyl-methacrylate, 2.4 g. of di-tert.-butyl-peroxide and 4.8 g. of tert.-dodecyl-mercaptan were added in the course of 5 hours, and polymerization was continued for 2 hours. The solids content of the reaction mixture had then reached the value of 45.6%. 30 parts each of the acrylic resin solution were mixed with 7.5, 15 or 22.5 parts of Desmodur N® (see Example 1) at about 100° C. and cured under greatly reduced pressure in 15 hours. The transparent, brittle cured products were ground to a fine powder, which decomposed at 235–260° C. and were unsoluble in xylene, ethanol, butanol, butyl acetate and acetone.

If a mixture of 30 parts of the above acrylate resin solution, 15 parts of Desmodur N® (see Example 1) and 0.15 part of 10-methoxy-benzoxanthene-3,4-dicarboxylic acid hydrazide were cured at 150° C. under greatly reduced pressure in 15 hours, a product of an intense green-yellow fluorescence was obtained, which was ground in a ball mill to give a daylight fluorescent pigment. It decomposed at 235–260° C. and was unsoluble in xylene, ethanol, butanol, butyl acetate and acetone.

Instead of 10-methoxybenzoxanthene-3,4-dicarboxylic acid hydrazide, the following fluorescent dyestuffs may be used (the flourescent shades are indicated):

benzoxanthene-3,4-dicarboxylic acid imide (green),
benzoxanthene-3,4-dicarboxylic acid-N-3'-sulfonamido-phenyl imide (green),
benzo-thioxanthene-3,4-dicarboxylic acid stearylic imide (greenish yellow),
benzo-thioxanthene-3,4-dicarboxylic acid hydrazide (greenish yellow),
4-amino-1,8-naphthal-2',4'-dimethyl phenyl imide (green) or
7-oxo-14-thio-dibenzo(b,d,e,f)-chrysene (orange yellow).

4 parts of the daylight fluorescent pigment obtained according to the above Example were mixed for 5 minutes at 160° C. with 96 parts of a pulverized polyvinyl chloride, which contained 3% of an organic tin stabilizer and 1% of oxystearic acid on a double roller mixer. The resulting coat was stripped off and compression-molded for 5 minutes at 170° C. The pressed sheet obtained had an intense green-yellow fluorescence.

EXAMPLE 3

A mixture of 120 g. of methyl-methacrylate, 160 g. of β-hydroxypropyl-methacrylate, 120 g. of styrene, 4.8 g. of di-tert.-butylperoxide and 9.6 g. of tert.-dodecyl mercaptan were added in the course of 5 minutes to 400 g. of ethyl glycol acetate heated to 140° C. and polymerization was continued for 2 hours at 140° C. The solids content of the reaction mixture had then reached the value of 50.9%. 30 parts each of this acrylate resin solution were mixed with 7.5, 15 or 22.5 parts of Desmodur N® (see Example 1) at about 100° C. and cured at 150° C. under greatly reduced pressure in 15 hours. The transparent, brittle cured products were ground to a fine powder. They decomposed at 230–260° C. and were unsoluble in xylene, ethanol butanol, butyl acetate and acetone.

A mixture of 30 parts of the above acrylate resin solution, 15 parts of Desmodur N® (see Example 1) and 0.18 part of benzoxanthene - 3,4 - dicarboxylic acid-hydroxy-ethyl imide was cured at 150° C. under greatly reduced pressure during 15 hours. A cured product of an intense green-yellow fluorescence was obtained. It was ground in a ball mill to give a daylight fluorescent pigment, which decomposed at 230–260° C. and was unsoluble in xylene, ethanol, butanol, butyl acetate and acetone.

For preparing an enamel, 20 parts of the daylight fluorescent pigment obtained according to the above Example were ground for 20 minutes on the paint shaker together with 45 parts of xylene, 25 parts of a 60% solution of a short-oil, non-drying alkyd resin from 37% of oil (triglyceride) and 40% of phthalic acid anhydride in xylene and with 10 parts of a 50% solution of an non-plasticized malamine resin in alcohols and aromatic hydrocarbons in the presence of quartzite perls (2–3 mm. φ) in a 200 ml. plastic beaker. The lacquer obtained was sprayed on white-coated test plates (30 x 30 cm.) and stoved for 20 minutes at 160° C. The resulting lacquer had an intense yellow-green fluorescence.

EXAMPLE 4

In a 1 l. round flask provided with a stirrer, Claisen connector, Liebig cooler and a graduated receiver, 388 g. of terephthalic acid dimethyl ester, 402 g. of 1,1,1-trimethylol propane and 0.116 g. of manganese-II-acetate were heated under a nitrogen atmosphere in about half an hour in the oil-bath to an oil-bath temperature of 150° C. The mass was melted. The oil-bath temperature was increased in 5 hours to 250° C. while stirring. 120 g. of methanol were distilled off, corresponding to 94% of the theoretical amount. The polyester thus obtained was slightly viscous, soluble in hot xylene/butanol (50:50 parts by volume) and had a hydroxyl number of 408–409.

40 parts each of a 50% solution of the above polyester resin in cyclohexanone, which contained 0.2 part of benzoxanthene-3,4-dicarboxylic acid hydroxy ethyl imide, were mixed with 26.4 or 39.6 parts of Desmodur N® (see Example 1) at about 100° C. and cured at 150° C. under greatly reduced pressure in 15 hours. Both cured products had an intense green-yellow fluorescence and were ground to a fine powder. They decomposed at 270–290° C. and at 290–330° C. and were unsoluble in heptane, xylene, butanol and acetone.

I claim:

1. A daylight fluorescent pigment composition consisting of an organic fluorescent dyestuff and a resin, said resin being a hydroxyl-containing polyester condensation product of a bi-functional or poly-functional organic carboxylic acid from the group adipic, phthalic, isophthalic, terephthalic, trimellitic and cyclohexane-dicarboxylic acid-(1,4) and a mixture thereof with fumaric or maleic acid with a bi-functional or poly-functional organic alcohol from the group ethylene glycol, 1,2-propylene glycol, 1,3-butylene glycol, 2,2-dimethyl-propane - diol - 1,3, butane-diol-1,4, hexane-diol-1,6, glycerol, trimethylolpropane, trimethylolethane, hexane-triol-1,2,6, pentaerythrite, hexite, 1,4-dihydroxy-methylbenzene, 1,4-dihydroxy-methylcyclohexane diethanol amine and a mixture thereof with butene-diol-1,4, or being a hydroxyl-containing copolymer condensation product of an olefinically unsaturated hydroxyl-containing compound from the group methacrylic acid-β-hydroxy ethyl ester or methacrylic acid-β-hydroxy-propyl ester with a hydroxyl-free olefinically unsaturated compound from the group methacrylic acid methyl, ethyl, propyl, n-butyl or t-butyl ester, styrene, α-methyl-styrene, acrylonitrile, vinylchloride, vinyl acetate, vinyl propionate and vinyl butyrate, said polyester or said copolymer being cross-linked with a bi-functional or a polyfunctional isocyanate from the group hexamethylene-1,6-diisocyanate, tetramethylene-1,4-diisocyanate, 2,2,4-trimethyl-hexamethylene-diisocyanate, methylcyclohexylene-diisocyanate, 2,6-diisocyanate-methylcaproate, isophorone-diisocyanate, dicyclohexyl-methane-diisocyanate, toluene diisocyanate and reaction products thereof with oligofunctional alcohols from the group ethylene glycol, neopentyl glycol, trimethylol ethane, trimethylol propane and pentaerythrite.

2. A composition according to claim 1 wherein said composition contains about 0.1% to about 10% of said dyestuff.

3. A composition according to claim 1 wherein said polyester has a hydroxyl number of about 200 to 600, a molecular weight of about 300 to 3000 and the molar proportion of said acid to said alcohol is about 0.5:1 to 2:1, and said copolymer has a molecular weight of about 10,000 to 80,000 and contains about 10% to 50% by weight of said hydroxyl-containing compound.

4. A composition according to claim 1 wherein said dyestuff is of the rhodamine, sulforhodamine or naphthalimide series.

References Cited

UNITED STATES PATENTS

| | | | |
|---|---|---|---|
| 2,503,209 | 4/1950 | Nyquist | 260—75 TN |
| 2,606,162 | 8/1952 | Coffey et al. | 260—75 TN |
| 2,729,618 | 1/1956 | Müller et al. | 260—75 TN |
| 2,828,278 | 3/1958 | Kosmin | 260—75 TN |
| 2,938,873 | 5/1960 | Kazenas | 252—301.3 R |
| 2,998,399 | 8/1961 | Petropoulos | 260—77.5 R |
| 3,373,221 | 3/1968 | May | 260—78.4 R |
| 3,412,036 | 11/1968 | McIntosh | 252—301.3 R |
| 3,553,157 | 1/1971 | Dijkstra et al. | 260—75 TN |
| 3,563,849 | 2/1971 | Rye et al. | 260—75 TN |

DANIEL E. WYMAN, Primary Examiner

A. P. DEMERS, Assistant Examiner

U.S. Cl. X.R.

106—288 Q; 252—301.3 R; 260—39, 41, 75 TN, 77.5 R, 78.4 R, 78.5 R